Patented Nov. 18, 1941

2,262,804

UNITED STATES PATENT OFFICE 2,262,804

CATALYST

James W. Jean, Altadena, Calif.

No Drawing. Application January 31, 1939, Serial No. 253,863

5 Claims. (Cl. 196—10)

My invention relates to an improved catalyst for use in accelerating various types of reaction among organic and inorganic compounds. More specifically this invention relates to a composite solid catalytic material which may be employed in segregated form and which may be used to accelerate reactions taking place in gaseous phase to produce hydrocarbon liquid. An object of my invention is the production of a solid form of catalyst which is less expensive and more effective for polymerizing unsaturated gases at comparatively lower temperatures and pressures than heretofore. A further object is the production of a solid form of catalyst of the type above indicated which is sufficiently porous to permit free and unobstructed flow of the gas which is being subjected to polymerization. One specific embodiment of the present invention comprises a catalyst for certain reactions, composed of a solid carrier coalesced and united with an inexpensive acid of highly efficient catalytic properties. Sulphuric acid has been employed as a liquid catalyst in organic reactions because of its high polymerizing ability, its cheapness and the readiness with which it may be procured, but such use has heretofore been found difficult for many reasons, among which are the highly corrosive and detrimental effects of the acid upon metal with which it contacts, and excessive activity of the acid resulting in excessive polymerization. These difficulties are entirely obviated by my invention.

The main feature of the present invention resides in the production of a consolidated catalyst composed of a porous non-silicious absorbent material coalesced with sulphuric acid, which in its composite solid condition and when reduced by segregation to a mass of pervious particles is adapted to readily polymerize the gas which is treated.

The catalyst of the character comprised within the present invention is producible by a series of relatively simple steps, comprising generally mixing liquid sulphuric acid and certain absorbent and reactive materials in selected proportions by which a solid, porous and dry body is produced, having highly effective catalytic properties. A typical example of the production of my improved catalyst may consist, first of thoroughly mixing together 100 grams of powdered borax; 600 grams of cocoa-nut charcoal screened to about 4 to 14 mesh; 600 grams of finely ground iron oxide, and 600 grams of lead oxide; and then slowly pouring 1000 ccs. of commercial sulphuric acid into said mixture while the latter is agitated. As the acid is added to the mixture the mass is quickly consolidated by coalescence and chemical reaction into a hard, solid, dry and porous substance of highly acid reaction which is easily segregated by fracture into hard, solid, dry, granular and porous particles.

In the above mixture the inert cocoa-nut charcoal gives body and absorbency to the consolidated mass; the iron oxide reacts with the acid to evolve gases and provide porosity as well as to solidify the carrier mixture; the lead oxide acts as a retarder and acid retainer, and the borax acts as a binder and hardener. The cocoa-nut charcoal is made by carbonizing cocoa-nut shells.

The following example of an actual run typifies the use of my improved catalyst for polymerizing refinery and olefinic gases although a number of others are available. The catalyst in segregated condition and screened to about 2 to 8 mesh was used in an upright treating tube 1¾ inches inside diameter by 27 inches long, maintained at a temperature of 50 to 100 degrees C., the optimum and usual temperature being approximately 80 degrees C. A mixture of saturated and unsaturated gases from an oil cracking plant, was passed downwardly through the catalyst while under 10 to 20 pounds pressure. This gas analyzed as follows:

| | Per cent by liquid volume |
|---|---|
| $H_2S$ | 0.15 |
| Ethane | 0.4 |
| Propane | 10.00 |
| Propene | 5.00 |
| Isobutane | 11.8 |
| Isobutene | 13.4 |
| Normal butene | 26.3 |
| Normal butane | 32.5 |
| Pentanes plus | 0.5 to 1.0 |

Thirty-one hours of such operation produced 4414 ccs. of low boiling polymer with 89 cubic feet of gas metered at the exit end consisting principally of saturated gases. This polymer as tested gave the following results:

| | Degrees F. |
|---|---|
| Initial boiling point | 99 |
| 5% over at | 135 |
| 10% over at | 153 |
| 20% over at | 183 |
| 30% over at | 205 |
| 40% over at | 218 |
| 50% over at | 226 |
| 60% over at | 234 |
| 70% over at | 248 |
| 80% over at | 274 |
| 90% over at | 340 |
| 95% over at | 368 |
| End point | 386 |

Recovery, 97½%.

With a Reid vapor pressure test at 100 degrees F. a pressure of 7.8 pounds per sq. in. was determined.

Due to the solid character of the catalytic mass as completed, the corrosive difficulties with the sulphuric acid held in combination in the mass is entirely obviated. This solid character of the catalyst together with its ability to operate at relatively low temperatures and pressures provides a means of regulating activity. Operating at these low temperatures this catalyst is not subject to serious deterioration and the life of the catalyst is thereby prolonged. Also at these low temperatures there is no formation of carbon on the catalyst with the result that regeneration of the catalyst is not necessary. Further these low temperatures result in the production of a low boiling polymer.

I have described the principles of operation of my invention together with the general combination of elements and the product resulting therefrom by which the invention can be carried into practice, but I desire to have it understood that various modifications can be made within the spirit of the invention and within the scope of the following claims.

I claim:

1. A catalyst for polymerization of olefins comprising a mixture of sulfuric acid and a sulfuric acid reactive absorbent material chemically blended with the sulfuric acid forming therewith by chemical reaction a hard, friable and porous acid-reacting mass, said absorbent material comprising a mixture of a porous carrier, iron oxide, lead oxide and borax.

2. Process of catalytically polymerizing normally gaseous olefins which comprises contacting said olefins at a temperature of from about 50 to 100° C. with a polymerization catalyst comprising a mixture of sulfuric acid and sulfuric acid reactive absorbent material chemically blended with the sulfuric acid forming therewith by chemical reaction a hard, friable and porous acid-reactive mass, said absorbent material comprising a mixture of a porous carrier, iron oxide, lead oxide and borax.

3. A hard, solid, friable, dry and porous catalyst of highly acid reaction, comprising a mixture of cocoanut charcoal, borax, iron oxide and lead oxide coalesced with sulfuric acid by chemical reaction.

4. A catalyst comprising the material resulting from the reaction of a mixture of borax, iron oxide, lead oxide, cocoanut charcoal and sulfuric acid.

5. A catalyst comprising a mixture of about equal proportions by weight of commercial sulfuric acid and a sulfuric acid reactive absorbent material chemically coalesced with said sulfuric acid, said absorbent material consisting essentially of a proportion by weight of powdered borax of the order of five percent and about equal proportions of cocoanut charcoal screened to about 4 to 14 mesh, finely ground iron oxide, and lead oxide.

JAMES W. JEAN.